United States Patent
Mantoan et al.

(10) Patent No.: US 11,417,490 B2
(45) Date of Patent: Aug. 16, 2022

(54) SEALED BATTERY FUSE MODULE WITH ENERGY DISSIPATING CAP

(71) Applicant: Littelfuse, Inc., Chicago, IL (US)

(72) Inventors: Davide Mantoan, Legnago (IT); Massimiliano Tinto, Verona (IT)

(73) Assignee: Littelfuse, Inc.

( * ) Notice: Subject to any disclaimer, the term of this patent is extended or adjusted under 35 U.S.C. 154(b) by 432 days.

(21) Appl. No.: 16/691,092

(22) Filed: Nov. 21, 2019

(65) Prior Publication Data
US 2020/0203110 A1 Jun. 25, 2020

Related U.S. Application Data

(60) Provisional application No. 62/782,973, filed on Dec. 20, 2018.

(51) Int. Cl.
| | |
|---|---|
| *H01H 85/175* | (2006.01) |
| *H01H 85/143* | (2006.01) |
| *H01H 85/20* | (2006.01) |
| *H01M 50/581* | (2021.01) |

(52) U.S. Cl.
CPC ........ *H01H 85/175* (2013.01); *H01H 85/143* (2013.01); *H01H 85/20* (2013.01); *H01M 50/581* (2021.01); *H01M 2200/103* (2013.01)

(58) Field of Classification Search
CPC .... H01H 85/143; H01H 85/175; H01H 85/20; H01H 85/38; H01H 2085/383; H01M 50/581; H01M 2200/103
See application file for complete search history.

(56) References Cited

U.S. PATENT DOCUMENTS

| | | | | |
|---|---|---|---|---|
| 5,645,448 | A  * | 7/1997  | Hill | H01H 85/205 |
| | | | | 439/522 |
| 7,172,462 | B1 | 2/2007 | Gronowicz, Jr. | |
| 7,192,319 | B1 * | 3/2007 | Rahman | H01R 11/12 |
| | | | | 439/766 |
| 2004/0018417 | A1 * | 1/2004 | Stack | H01M 50/572 |
| | | | | 429/61 |
| 2009/0066469 | A1 | 3/2009 | Rahman et al. | |
| 2011/0285496 | A1 * | 11/2011 | Urrea | H01H 85/12 |
| | | | | 337/188 |
| 2012/0064771 | A1 * | 3/2012 | Urrea | H01H 85/205 |
| | | | | 439/620.29 |

(Continued)

*Primary Examiner* — Jacob R Crum
(74) *Attorney, Agent, or Firm* — KDB Firm PLLC

(57) ABSTRACT

A fuse module including a mounting block having a through-hole extending therethrough, a fuse including an upper portion disposed on a top of the mounting block and having a through-hole, a lower portion disposed on a bottom of the mounting block and having a through-hole, and a fusible element disposed adjacent a sidewall of the mounting block and connecting the upper portion to the lower portion, the fuse module further including a housing having a main body portion encasing the mounting block and the fuse, the main body portion having apertures in top and bottom surfaces thereof aligned with the through-hole of the mounting block, and a cap portion connected to the main body portion and disposed over the fusible element, the cap portion having surface features extending from an interior surface thereof for absorbing energy upon occurrence of an overcurrent condition in the fuse.

17 Claims, 6 Drawing Sheets

(56) References Cited

U.S. PATENT DOCUMENTS

| | | | |
|---|---|---|---|
| 2015/0093610 A1* | 4/2015 | Byun | H01M 50/581 |
| | | | 429/61 |
| 2016/0071678 A1* | 3/2016 | Schwartz | H01H 85/2045 |
| | | | 361/115 |
| 2016/0172143 A1* | 6/2016 | Yoneda | H01H 85/08 |
| | | | 337/186 |
| 2016/0372294 A1 | 12/2016 | Nan et al. | |
| 2018/0096814 A1* | 4/2018 | Onoda | H01H 85/10 |

* cited by examiner

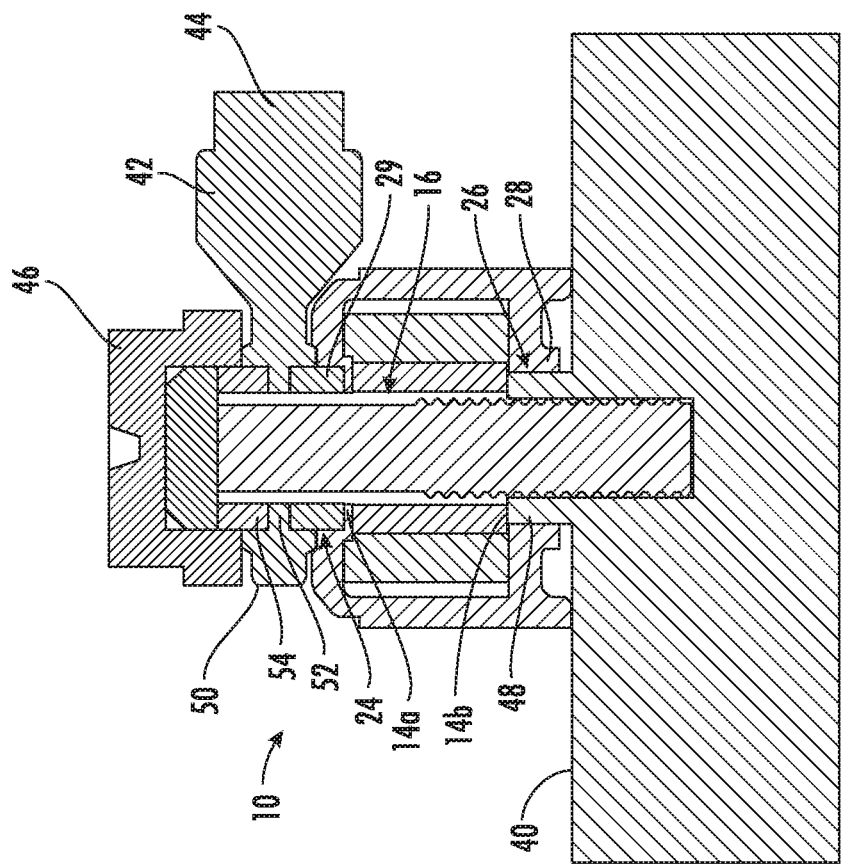
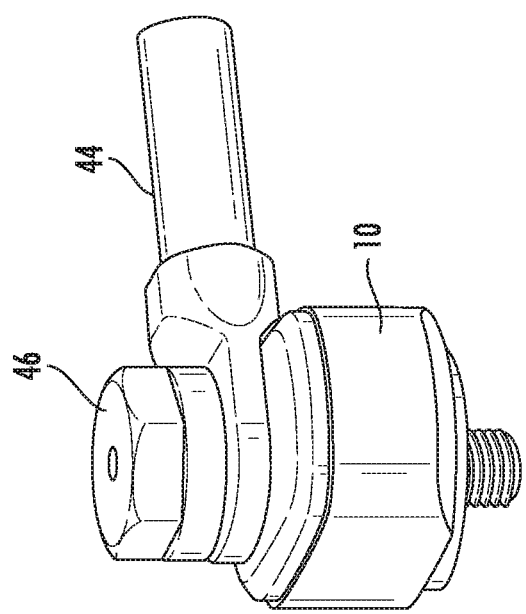
FIG. 6A
FIG. 6B

SEALED BATTERY FUSE MODULE WITH ENERGY DISSIPATING CAP

CROSS-REFERENCES TO RELATED APPLICATIONS

This application claims the benefit of U.S. Provisional Patent Application No. 62/782,973, filed Dec. 20, 2018, which is incorporated by reference herein in its entirety.

FIELD OF THE DISCLOSURE

The disclosure relates generally to the field of circuit protection devices and relates more particularly to a sealed battery fuse module with a cover adapted to dissipate energy from a blown fusible element.

BACKGROUND OF THE DISCLOSURE

Battery fuse modules are sometimes implemented in vehicular applications. In a typical implementation, a battery fuse module is mounted directly to a terminal of a vehicle battery (e.g., a battery of an automobile or industrial vehicle), electrically in series between the battery and a connected load. Upon the occurrence of an overcurrent condition, a fusible element within the battery fuse module melts, disintegrates, or otherwise opens to arrest the flow of current through the battery fuse module. The battery fuse module thereby prevents or mitigates electrical damage to the battery and/or the load that would otherwise result if the overcurrent condition were allowed to persist.

When the fusible element of a battery fuse module is melted or otherwise opened during an overcurrent condition, it is sometimes possible for an electrical arc to propagate between the separated portions of the fusible element. In some cases, the electrical arc may rapidly heat surrounding air and ambient particulate and may cause a small explosion. In some applications, such as those in which a battery fuse module is implemented in an environment in which volatile gases are present, it is critical that any electrical arcing and resulting explosion that may occur within a battery fuse module be contained.

It is with respect to these and other considerations that the present improvements may be useful.

SUMMARY

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

A fuse module in accordance with an exemplary embodiment of the present disclosure may include a mounting block having a through-hole extending therethrough, a fuse having an upper portion disposed on a top of the mounting block and having a through-hole aligned with the through-hole of the mounting block, a lower portion disposed on a bottom of the mounting block and having a through-hole aligned with the through-hole of the mounting block, and a fusible element disposed adjacent a sidewall of the mounting block and connecting the upper portion of the fuse to the lower portion of the fuse. The fuse module may further include a housing having a main body portion encasing the mounting block and the fuse, the main body portion having apertures in top and bottom surfaces thereof that are aligned with the through-hole of the mounting block and that expose underlying surfaces of the upper and lower portions of the fuse, and a cap portion connected to the main body portion and disposed over the fusible element, the cap portion having surface features extending from an interior surface thereof for absorbing energy upon occurrence of an overcurrent condition in the fuse.

A circuit protection arrangement in accordance with an exemplary embodiment of the present disclosure may include a fuse module connected electrically in series between a battery and a ring terminal of a conductor, the fuse module including a mounting block having a through-hole extending therethrough, a fuse having an upper portion disposed on a top of the mounting block and having a through-hole aligned with the through-hole of the mounting block, a lower portion disposed on a bottom of the mounting block and having a through-hole aligned with the through-hole of the mounting block, and a fusible element disposed adjacent a sidewall of the mounting block and connecting the upper portion of the fuse to the lower portion of the fuse. The fuse module may further include a housing having a main body portion encasing the mounting block and the fuse, the main body portion having apertures in top and bottom surfaces thereof that are aligned with the through-hole of the mounting block and that expose underlying surfaces of the upper and lower portions of the fuse, and a cap portion connected to the main body portion and disposed over the fusible element, the cap portion having surface features extending from an interior surface thereof for absorbing energy upon occurrence of an overcurrent condition in the fuse. The circuit protection arrangement may further include an electrically insulating screw extending through the ring terminal and the fuse module and engaging a threaded terminal of the battery, whereby the electrically insulating screw secures the ring terminal, the fuse, and the battery terminal in electrical communication with one another.

BRIEF DESCRIPTION OF THE DRAWINGS

FIG. 6A is a perspective view illustrating the fuse module shown in FIG. 1 installed on a battery.

FIG. 6B is a cross sectional view illustrating the fuse module shown in FIG. 1 installed on a battery.

DETAILED DESCRIPTION

A battery fuse module in accordance with the present disclosure will now be described more fully with reference to the accompanying drawings, in which preferred embodiments of the battery fuse module are presented. It will be understood, however, that the battery fuse module may be embodied in many different forms and should not be construed as being limited to the embodiments set forth herein. Rather, these embodiments are provided so that this disclosure will convey certain exemplary aspects of the battery fuse module to those skilled in the art.

Figure 1:
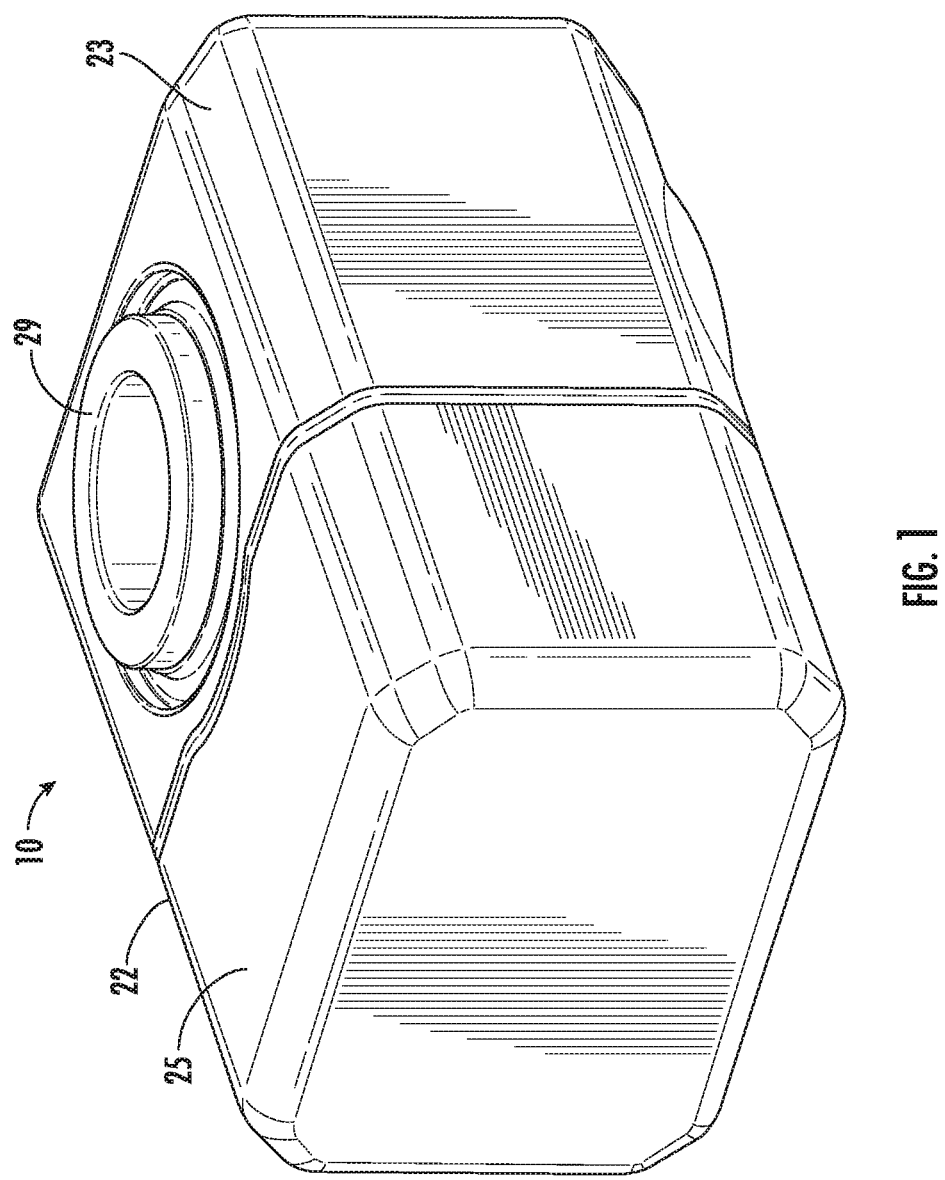
FIG. 1 is a perspective view illustrating a fuse module in accordance with an exemplary embodiment of the present disclosure.

Referring to FIG. 1, a perspective view illustrating a battery fuse module 10 (hereinafter "the fuse module 10") in accordance with an exemplary, non-limiting embodiment of the present disclosure is shown. As will be described in greater detail below, the fuse module 10 may be coupled directly to a terminal of a battery (e.g., a vehicle battery) with no flexible electrical conductors extending therebetween and may provide overcurrent protection for an electrical load that is powered by the battery. Advantageously, a fusible element of the fuse module 10 is sealed within a resilient housing having an energy-dissipating cap so that any electrical arcing and resulting explosion that may occur in the fuse module 10 during an over-current condition are entirely contained within the fuse module 10 to prevent ignition of volatile gases that may be present in the environment of the fuse module 10.

Figure 2:
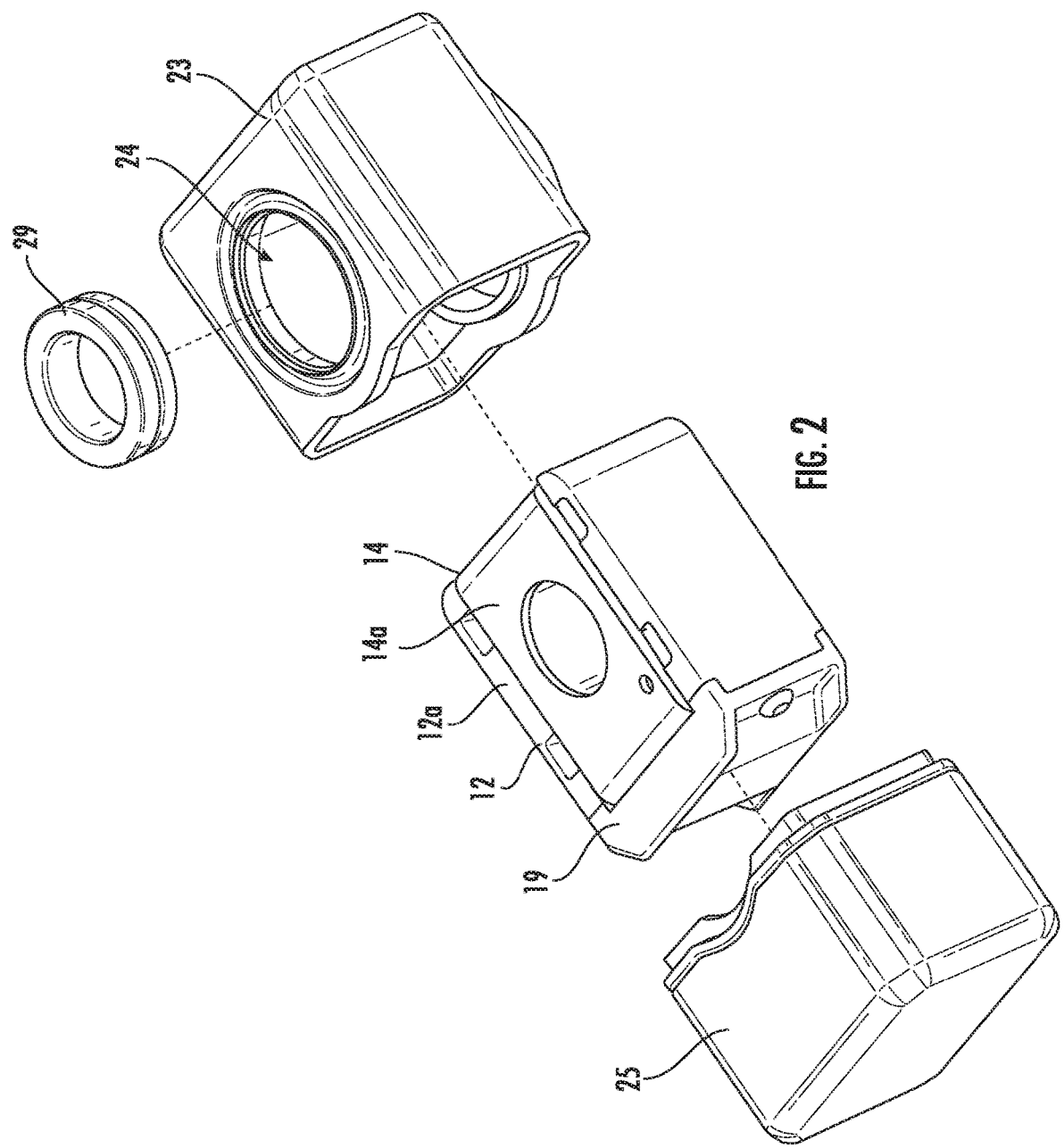
FIG. 2 is an exploded view illustrating components of the fuse module shown in FIG. 1.
Figure 3:
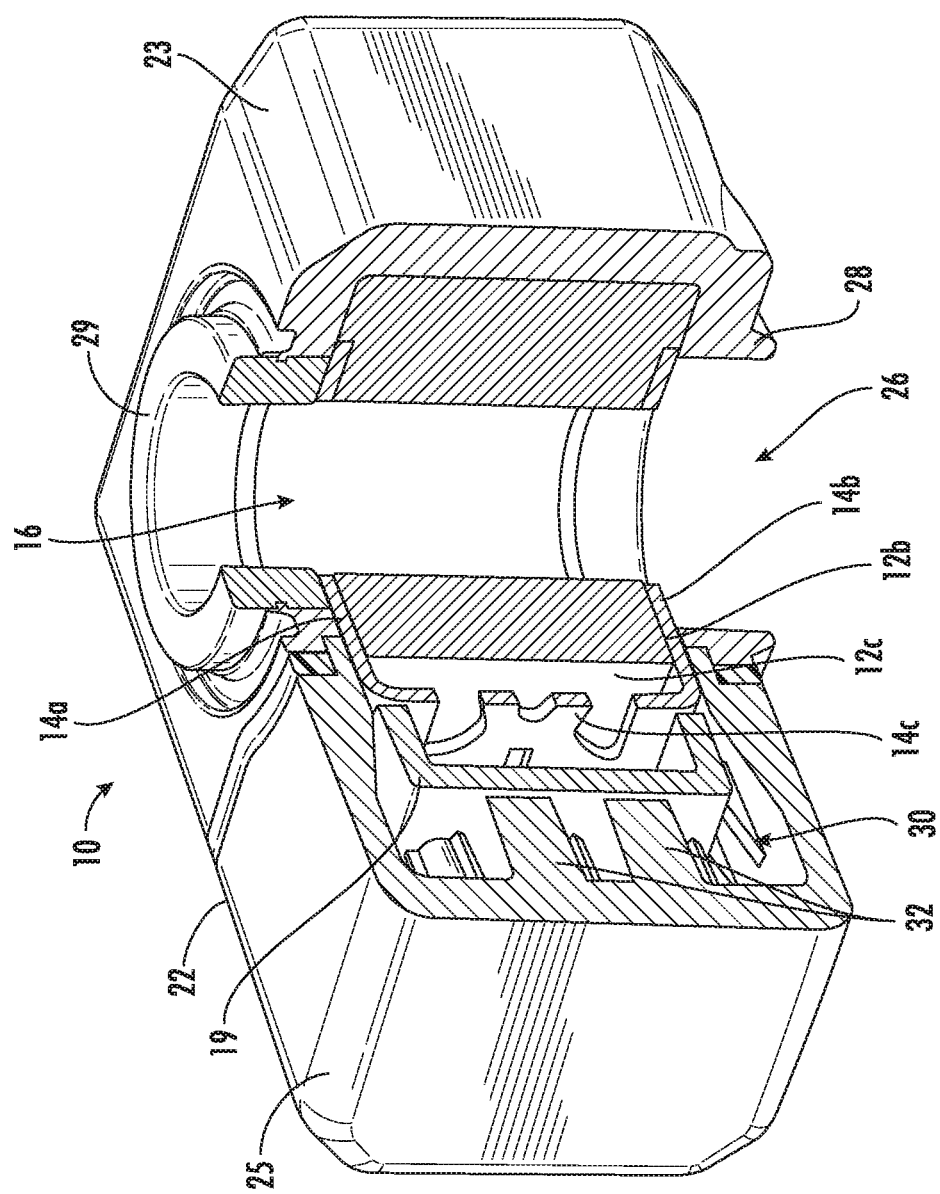
FIG. 3 is a cutaway view illustrating components of the fuse module shown in FIG. 1.
Figure 4:
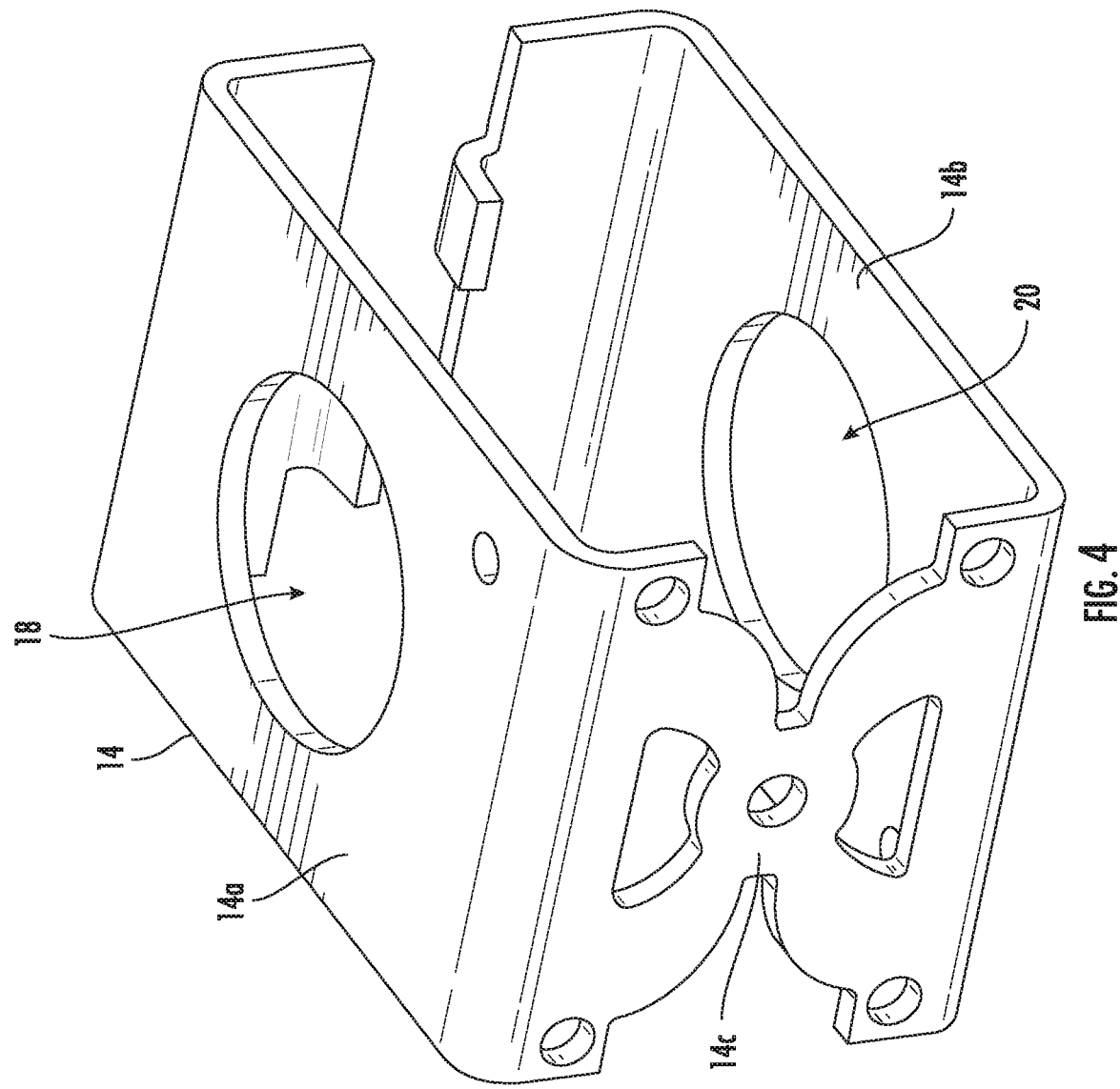
FIG. 4 is a perspective view illustrating a fuse of the fuse module shown in FIG. 1.

Referring to the exploded and cutaway views shown in FIGS. 2 and 3, respectively, the fuse module 10 may generally include a mounting block 12 formed of an electrically insulating material and a fuse 14 that extends around several surfaces of the mounting block 12. Particularly, the fuse 14 (which is shown in isolation in FIG. 4 for clarity) includes an upper portion 14a disposed on a top surface 12a of the mounting block 12, a lower portion 14b disposed on a lower surface 12b of the mounting block 12, and a fusible element 14c disposed adjacent a sidewall 12c of the mounting block 12 and connecting the upper portion 14a to the lower portion 14b. The mounting block 12 may include a through-hole 16 extending vertically therethrough, and the upper and lower portions 14a, 14b of the fuse 14 may each have through-holes 18, 20 that are aligned with the through-hole 16 of the mounting block 12. The mounting block 12 may further include a cover 19 that fits over the fusible element 14c and attaches to the sidewall 12c.

The fuse module 10 may further include an electrically insulating, resilient housing 22 that encases the mounting block 12 and the fuse 14. In various embodiments, the housing 22 may be formed of rubber, plastic, various composites, etc. The housing 22 may include a main body portion 23 and a cap portion 25. Top and bottom surfaces of the main body portion 23 may include apertures 24, 26 formed therein for exposing and providing access to underlying surfaces of the upper portion 14a and the lower portion 14b of the fuse 14, respectively. An annular lip 28 extends several millimeters from the bottom surface of the main body portion 23 and surrounds the aperture 26.

The fuse module may further include a conductive ring 29 disposed within the aperture 24 in the top surface of the main body portion 23. In various embodiments, the conductive ring 29 may be formed of copper, silver, gold, tin, etc. The present disclosure is not limited in this regard. The conductive ring 29 may be seated on the exposed surface of the upper portion 14a of the fuse 14 in electrical communication therewith. The conductive ring 29 may protrude from the aperture 24 and may extend several millimeters above the top surface of the main body portion 23.

Figure 5:
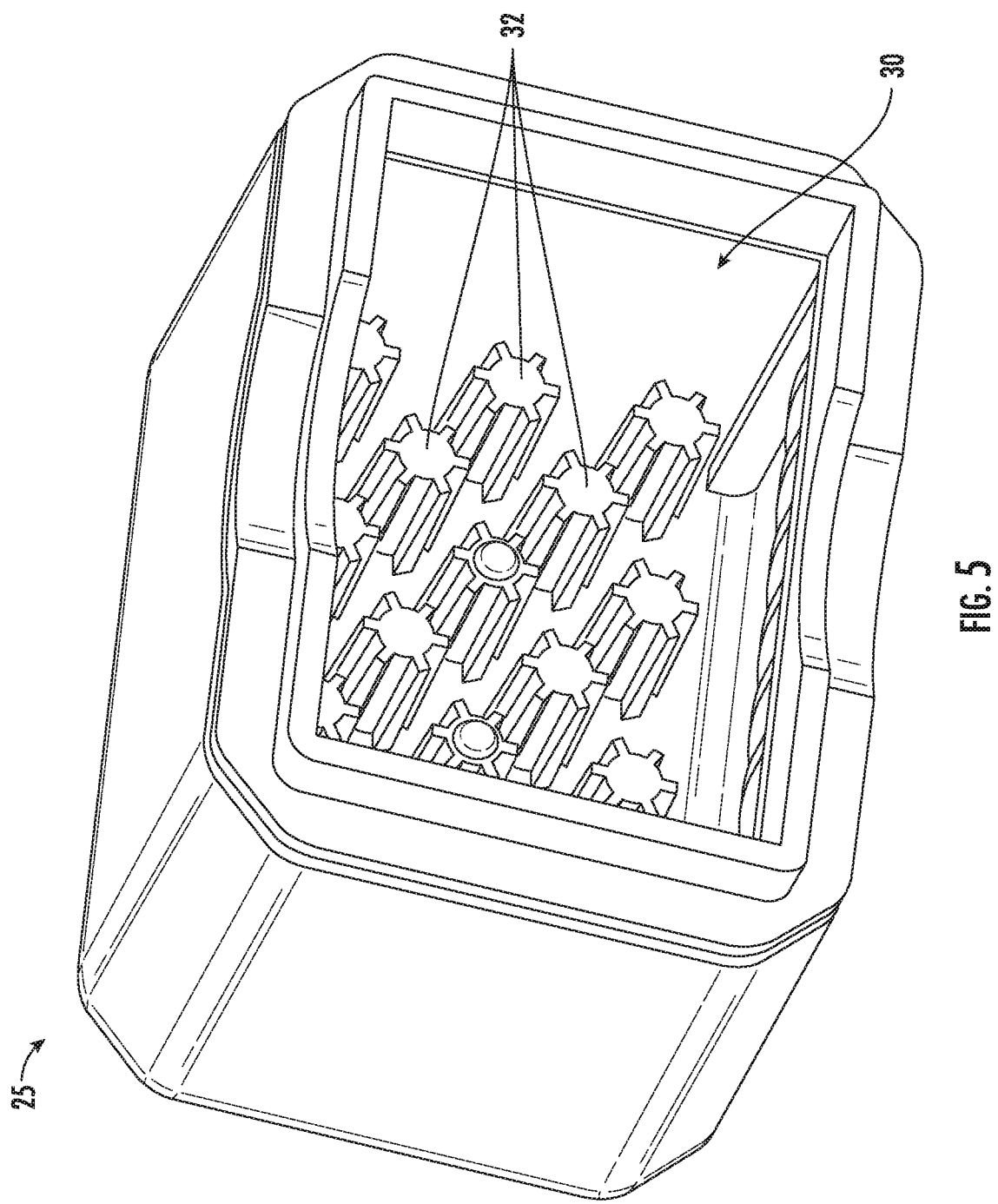
FIG. 5 is a perspective view illustrating a cap portion of a housing of the fuse module shown in FIG. 1.

The cap portion 25 of the housing 22 may fit over the cover 19 and the underlying fusible element 14c and may be attached to the main body portion 23 of the housing 22 in a fluid-tight relationship therewith (as further described below). Referring now to FIG. 5, a perspective view illustrating the cap portion 25 in isolation is provided for clarity of description. The cap portion 25 may be generally cup-shaped and may define an interior cavity 30. A plurality of surface features 32 may extend from one or more interior surfaces of the cap portion 25 into the interior cavity 30. In the exemplary embodiment shown in FIG. 5, the surface features 32 are frustoconical protrusions with vertical ridges extending radially therefrom. The present disclosure is not limited in this regard, and various alternative embodiments of the cap portion 25 are contemplated in which the surface features 32 may additionally or alternatively include various ridges, protrusions, castellations, barriers, channels, contours, etc. of different shapes and sizes.

Referring again to the cutaway view of the assembled fuse module 10 shown in FIG. 3, the surface features 32 of the cap portion 25 may be disposed immediately adjacent the cover 19 and the underlying fusible element 14c, and the interior cavity 30 of the cap portion 25 may define an air pocket immediately adjacent the cover 19 and the underlying fusible element 14c. Thus, if an overcurrent condition in the fuse module 10 causes the fusible element 14c to melt and produce an explosion, the air pocket defined by the cap portion 25 may provide an expansion space for containing the energy of the explosion. Additionally, the surface features 32 may provide significant surface area between the fusible element 14c and the interior surfaces of the cap portion 25 to absorb the energy of the explosion. Thus, the risk of the fuse module 10 being ruptured is mitigated, which in-turn mitigates the risk of an arc in the melted fusible element 14c igniting volatile gases in the atmosphere surrounding the fuse module 10.

In a non-limiting embodiment, the fuse module 10 may be assembled by arranging the mounting block 12, the fuse 14, the conductive ring 29, and the preformed (e.g., molded, 3D-printed, etc.) cap portion 25 together in the manner shown in FIG. 3. The main body portion 23 of the housing 22 may then be overmolded onto and around the mounting block 12, the fuse 14, and the conductive ring 29, in abutment with the cap portion 25 of the housing 22. The molten material used to form the main body portion 23 of housing 22 during the overmolding process may melt, and may join with, the lip of the cap portion 25, resulting in a fluid-tight juncture between the cap portion 25 and the main body portion 23.

Referring to FIGS. 6A and 6B, the fuse module 10 is shown operatively installed in a protected circuit arrangement wherein the fuse module 10 is connected between a battery 40 and an insulated ring terminal 42 of a conductor 44. An electrically insulating screw 46 (e.g., a metallic screw with an electrically insulating coating) extends through each of the ring terminal 42, the conductive ring 29, and the through-holes 18, 16, 20 of the upper portion 14a, the mounting block 12, and the lower portion 14b, and is fastened to an annular, threaded terminal 48 of the battery 40. The conductive ring 29 extends through an aperture in an insulative coating 50 of the ring terminal 42 and engages a conductive (i.e., metal) portion 52 of the ring terminal 42. An electrically insulating ring 54 may be disposed between a metallic head 56 of the screw 46 and the conductive portion 52 of the ring terminal 42 for providing electrical insulating therebetween. The resilient, insulative coating 50 of the ring terminal 42 may engage, and form a seal with, the top surface of the main body portion 23. Similarly, the annular battery terminal 48 may extend through the aperture 26 in the bottom surface of the main body portion 23 and may engage the lower portion 14b of the fuse 14, and the annular lip 28 of the main body portion 23 may engage, and form a seal with, the top surface of the battery 40. An overcurrent-protected electrical connection is thereby provided between the battery 40 and the ring terminal 42.

Those of ordinary skill in the art will appreciate that the above-described fuse module 10 provides numerous advantages that facilitate safe operation in hazardous environments. For example, the fusible element 14c of the fuse module 10 is sealed within a resilient housing 22 having an energy-dissipating cap 25 so that any electrical arcing and resulting explosion that may occur in the fuse module 10 during an over-current condition are entirely contained to prevent ignition of volatile gases that may be present in the environment of the fuse module 10.

As used herein, an element or step recited in the singular and proceeded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

While the present disclosure makes reference to certain embodiments, numerous modifications, alterations and changes to the described embodiments are possible without departing from the sphere and scope of the present disclosure, as defined in the appended claim(s). Accordingly, it is intended that the present disclosure not be limited to the described embodiments, but that it has the full scope defined by the language of the following claims, and equivalents thereof.

The invention claimed is:

1. A fuse module comprising:
a mounting block having a through-hole extending therethrough; a fuse comprising: an upper portion disposed on a top of the mounting block and having a through-hole aligned with the through-hole of the mounting block;
a lower portion disposed on a bottom of the mounting block and having a through-hole aligned with the through-hole of the mounting block; and
a fusible element disposed adjacent a sidewall of the mounting block and connecting the upper portion of the fuse to the lower portion of the fuse; and
a housing comprising: a main body portion encasing the mounting block and the fuse, the main body portion having apertures in top and bottom surfaces thereof that are aligned with the through-hole of the mounting block and that expose underlying surfaces of the upper and lower portions of the fuse; and a cap portion connected to the main body portion and disposed over the fusible element, the cap portion having surface features extending from an interior surface thereof for absorbing energy upon occurrence of an overcurrent condition in the fuse, wherein the surface features include frustoconical protrusions having ridges formed on sidewalls thereof.

2. The fuse module of claim 1, wherein the main body portion includes an annular lip extending from the bottom surface thereof, the annular lip surrounding the aperture in the bottom surface of the main body portion.

3. The fuse module of claim 1, further comprising an electrically conductive ring disposed within the aperture in the top surface of the main body portion and seated on the upper portion of the fuse.

4. The fuse module of claim 3, wherein the conductive ring protrudes from the aperture in the top surface of the main body portion and extends above the top surface of the main body portion.

5. The fuse module of claim 1, wherein the cap portion forms a fluid-tight seal with the main body portion.

6. The fuse module of claim 1, wherein the mounting block includes a cover disposed over the fusible element, immediately adjacent the cap portion.

7. The fuse module of claim 1, wherein the housing is formed of an electrically insulating, resilient material.

8. A protected circuit arrangement comprising:
a fuse module connected electrically in series between a battery and a ring terminal of a conductor, the fuse module comprising:
a mounting block having a through-hole extending therethrough;
a fuse comprising: an upper portion disposed on a top of the mounting block and having a through-hole aligned with the through-hole of the mounting block;
a lower portion disposed on a bottom of the mounting block and having a through-hole aligned with the through-hole of the mounting block; and
a fusible element disposed adjacent a sidewall of the mounting block and connecting the upper portion of the fuse to the lower portion of the fuse; and
a housing comprising:
a main body portion encasing the mounting block and the fuse, the main body portion having apertures in top and bottom surfaces thereof that are aligned with the through-hole of the mounting block and that expose underlying surfaces of the upper and lower portions of the fuse; and
a cap portion connected to the main body portion and disposed over the fusible element, the cap portion having surface features extending from an interior surface thereof for absorbing energy upon occurrence of an overcurrent condition in the fuse;
an electrically insulating screw extending through the ring terminal and the fuse module and engaging a threaded terminal of the battery, whereby the electrically insulating screw secures the ring terminal, the fuse, and the battery terminal in electrical communication with one another; and
an electrically conductive ring disposed within the aperture in the top surface of the main body portion and seated on the upper portion of the fuse, wherein the conductive ring extends through an aperture in an insulative coating of the ring terminal and engages a conductive portion of the ring terminal.

9. The protected circuit arrangement of claim 8, further comprising an electrically insulating ring disposed between a metallic head of the electrically insulating screw and a conductive portion of the ring terminal for providing electrical insulating therebetween.

10. The protected circuit arrangement of claim 8, wherein a resilient, electrically insulative coating of the ring terminal engages, and form a seal with, the top surface of the main body portion.

11. The protected circuit arrangement of claim 8, wherein the battery terminal extends through the aperture in the bottom surface of the main body portion and engages the lower portion of the fuse.

12. The protected circuit arrangement of claim 8, wherein the main body portion includes an annular lip extending from the bottom surface thereof, the annular lip surrounding the aperture in the bottom surface of the main body portion, wherein the annular lip engages, and forms a seal with, a top surface of the battery.

13. The protected circuit arrangement of claim 8, wherein the cap portion forms a fluid-tight seal with the main body portion.

14. The protected circuit arrangement of claim 8, wherein the surface features include one or more of ridges, protrusions, castellations, barriers, channels, and contours.

15. The protected circuit arrangement of claim 14, wherein the surface features include frustoconical protrusions having ridges formed on sidewalls thereof.

16. The protected circuit arrangement of claim 8, wherein the mounting block includes a cover disposed over the fusible element, immediately adjacent the cap portion.

17. The protected circuit arrangement of claim 8, wherein the housing is formed of an electrically insulating, resilient material.

\* \* \* \* \*